(12) United States Patent
Valko et al.

(10) Patent No.: US 9,181,628 B2
(45) Date of Patent: *Nov. 10, 2015

(54) COATING/SEALANT SYSTEMS, AQUEOUS RESINOUS DISPERSIONS, AND METHODS OF ELECTROCOATING

(75) Inventors: Joseph Theodore Valko, Pittsburgh, PA (US); Robin M. Peffer, Valencia, PA (US); Michael A. Mayo, Pittsburgh, PA (US); Lawrence G. Anderson, Allison Park, PA (US); Thor G. Lingenfelter, Evans City, PA (US); Beth Furar, Pittsburgh, PA (US)

(73) Assignee: PRC-DeSoto International, Inc., Sylmar, CA (US)

( * ) Notice: Subject to any disclaimer, the term of this patent is extended or adjusted under 35 U.S.C. 154(b) by 184 days.

This patent is subject to a terminal disclaimer.

(21) Appl. No.: 13/232,093

(22) Filed: Sep. 14, 2011

(65) Prior Publication Data

US 2013/0065057 A1    Mar. 14, 2013

(51) Int. Cl.
| | |
|---|---|
| C25D 5/44 | (2006.01) |
| C25D 13/04 | (2006.01) |
| C09D 5/44 | (2006.01) |
| C08G 59/14 | (2006.01) |
| C08G 59/30 | (2006.01) |
| C08G 59/32 | (2006.01) |
| C09D 163/00 | (2006.01) |
| C09D 181/04 | (2006.01) |
| C25D 5/50 | (2006.01) |
| C25D 13/22 | (2006.01) |

(52) U.S. Cl.
CPC ............... *C25D 5/44* (2013.01); *C08G 59/1488* (2013.01); *C08G 59/304* (2013.01); *C08G 59/3272* (2013.01); *C09D 5/443* (2013.01); *C09D 5/448* (2013.01); *C09D 5/4419* (2013.01); *C09D 5/4442* (2013.01); *C09D 5/4484* (2013.01); *C09D 163/00* (2013.01); *C09D 181/04* (2013.01); *C25D 13/04* (2013.01); *C25D 5/50* (2013.01); *C25D 13/22* (2013.01); *Y10T 428/31511* (2015.04)

(58) Field of Classification Search
CPC .......... C08G 59/1483; C08G 59/1488; C08G 59/304; C08G 59/3272; C09D 163/00; C09D 181/04; C09D 5/4419; C09D 5/443; C09D 5/4442; C09D 5/4476; C09D 5/448; C09D 5/4484; C09D 13/04; C09D 13/22; C09D 5/44; C09D 5/50; Y10T 428/31511
See application file for complete search history.

(56) References Cited

U.S. PATENT DOCUMENTS

| | | | |
|---|---|---|---|
| 3,770,664 A * | 11/1973 | Chono et al. | 526/138 |
| 4,322,459 A * | 3/1982 | Castellucci et al. | 427/386 |
| 4,360,614 A | 11/1982 | Castellucci et al. | |
| 4,434,256 A | 2/1984 | Dworak et al. | |
| 4,623,711 A | 11/1986 | Morris et al. | |
| 4,829,105 A | 5/1989 | Yamada et al. | |
| 5,086,092 A | 2/1992 | Schupp et al. | |
| 5,250,325 A | 10/1993 | Phillips et al. | |
| 5,277,709 A | 1/1994 | Armstrong et al. | |
| 5,344,858 A | 9/1994 | Hart et al. | |
| 5,498,502 A | 3/1996 | Muramoto et al. | |
| 5,648,171 A | 7/1997 | von Gentzkow et al. | |
| 5,756,638 A | 5/1998 | van Gentzkow et al. | |
| 6,172,179 B1 | 1/2001 | Zook et al. | |
| 6,248,225 B1 | 6/2001 | Palaika et al. | |
| 6,271,377 B1 | 8/2001 | Galbo et al. | |
| 6,312,812 B1 * | 11/2001 | Hauser et al. | 428/412 |
| 6,479,151 B2 | 11/2002 | Buter et al. | |
| 6,525,168 B2 | 2/2003 | Zook et al. | |
| 6,632,860 B1 | 10/2003 | Hansen et al. | |
| 6,818,116 B2 | 11/2004 | Stoffer et al. | |
| 7,241,371 B2 | 7/2007 | Stoffer et al. | |
| 7,494,716 B2 | 2/2009 | Ehmann et al. | |
| 7,524,564 B2 | 4/2009 | Cosman | |
| 7,759,419 B2 | 7/2010 | Stoffer et al. | |
| 2003/0004231 A1 | 1/2003 | Ehmann et al. | |
| 2004/0050704 A1 | 3/2004 | Rakiewicz et al. | |
| 2004/0079647 A1 | 4/2004 | Warburton et al. | |
| 2004/0249043 A1 | 12/2004 | Stoffer et al. | |
| 2005/0215670 A1 | 9/2005 | Shimasaki et al. | |
| 2006/0113007 A1 | 6/2006 | Morris | |
| 2007/0048550 A1 | 3/2007 | Millero et al. | |
| 2008/0090069 A1 | 4/2008 | Walters et al. | |
| 2009/0045071 A1 | 2/2009 | Valko et al. | |
| 2009/0065101 A1 | 3/2009 | Morris | |
| 2010/0243108 A1 | 9/2010 | Karabin et al. | |
| 2011/0008625 A1 | 1/2011 | Peffer et al. | |

FOREIGN PATENT DOCUMENTS

| | | |
|---|---|---|
| EP | 0174628 | 12/1991 |
| EP | 0469491 | 1/1995 |
| EP | 1319033 | 4/2007 |

(Continued)

OTHER PUBLICATIONS

Machine translation of JP 2003160642 (2012).*

(Continued)

*Primary Examiner* — Callie Shosho
*Assistant Examiner* — John Freeman
(74) *Attorney, Agent, or Firm* — William R. Lambert

(57) ABSTRACT

A coating/sealant system that includes a coating and a sealant deposited over at least a portion of the coating, in which the coating includes a reaction product formed from reactants comprising a phosphated epoxy resin and a curing agent, and the sealant includes a sulfur-containing polymer.

30 Claims, No Drawings

(56) References Cited

FOREIGN PATENT DOCUMENTS

| | | | |
|---|---|---|---|
| JP | 2003160642 A | * | 6/2003 |
| RU | 2129570 | | 4/1999 |
| RU | 2282648 | | 3/2004 |
| RU | 2 268 277 C2 | | 1/2006 |
| WO | 9119837 | | 12/1991 |
| WO | 9923280 | | 5/1999 |
| WO | 0032351 | | 6/2000 |
| WO | 0146495 | | 6/2001 |
| WO | 2004003086 | | 1/2004 |
| WO | 2009023690 | | 2/2009 |
| WO | 2010117479 | | 10/2010 |
| WO | 2013052190 | | 4/2013 |

OTHER PUBLICATIONS

Machine translation of RU 2 268 277 C2.

* cited by examiner

COATING/SEALANT SYSTEMS, AQUEOUS RESINOUS DISPERSIONS, AND METHODS OF ELECTROCOATING

STATEMENT REGARDING FEDERALLY SPONSORED RESEARCH

This invention was made with Government support under Contract No. FA8650-05-C-5010 awarded by the Air Force Research Laboratory. The United States Government may have certain rights in this invention.

FIELD OF THE INVENTION

The present invention relates to coating/sealant systems, anionic resinous dispersions, and methods for electrocoating using such dispersions.

BACKGROUND OF THE INVENTION

Sulfur-containing polymers are known to be well-suited for use in various applications, such as aerospace sealant compositions, due, in large part, to their fuel-resistant nature upon cross-linking. One class of sulfur-containing polymers often used in aerospace sealant compositions is polysulfides, which are polymers that have disulfide (—S—S—) linkages. Aerospace sealants that include sulfur-containing polymers, such as polysulfides, may be applied to the joint or space formed by the interface between electrically conductive substrates, such as those comprising aluminum, to which a previously deposited corrosion resistant primer coating has previously been applied. It is important that the sealant and primer coating adhere well to each other and to the substrate, though this has not always been achieved.

SUMMARY OF THE INVENTION

In certain respects, the present invention is directed to coating/sealant systems. These systems comprise a coating and a sealant deposited over at least a portion of the coating. The coating comprises a reaction product formed from reactants comprising: (i) a phosphated epoxy resin; and (ii) a curing agent, and the sealant is deposited from a composition comprising a sulfur-containing polymer comprising a thiol-functional polysulfide.

In other respects, the present invention is directed to aqueous resinous dispersions. These dispersions comprise a base-neutralized resinous composition that comprises an ungelled phosphated epoxy resin. The ungelled phosphated epoxy resin comprises a reaction product formed from reactants comprising: (a) a polyepoxide; (b) a sulfur-functional azole; and (c) a phosphorous acid.

In yet other respects, the present invention is directed to methods of electrocoating an electrically conductive substrate serving as an anode in an electrical circuit comprising the anode and a cathode that are immersed in an aqueous resinous dispersion comprising passing electric current between the anode and the cathode to cause a resinous composition to deposit on the anode. In these methods, the dispersion comprises an anionic resin comprising a reaction product formed from reactants comprising: (a) a polyepoxide; (b) a sulfur-functional azole; and (c) a phosphorous acid.

The present invention is also directed to, inter alia, related coated substrates, including aerospace vehicles comprising a substrate coated with a composition described herein and/or a coating/sealant system described herein.

DETAILED DESCRIPTION OF EMBODIMENTS OF THE INVENTION

For purposes of the following detailed description, it is to be understood that the invention may assume various alternative variations and step sequences, except where expressly specified to the contrary. Moreover, other than in any operating examples, or otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As indicated above, certain embodiments of the present invention are directed to coating/sealant systems. As used herein, the term "coating/sealant system" refers to a combination that includes a layer of coating and a sealant deposited over at least a portion of the coating. As used herein, the term "coating" refers to a substantially continuous polymer layer supported on a substrate, which may or may not have a uniform thickness. As used herein, the term "sealant" refers to a solid elastomer that, when applied to an aperture (such as the joint or space formed by the interface between two parts), has the ability to resist atmospheric conditions, such as moisture and temperature, and at least partially block the transmission of materials, such as water, fuel, and/or other liquids and gasses, which might otherwise occur at the aperture. Sealants, therefore, are often applied to a peripheral edge surface of a component part for the purpose of hindering material transport to or from such a part. In certain embodiments, the coating/sealant systems of the present invention are useful on aerospace fuel tanks. Thus, in certain embodiments of the present invention, the sealant is "fuel-resistant", which, as used herein, refers to a cured sealant that has a percent volume swell of not greater than 40%, in some cases not greater than 25%, in some cases not greater than 20% after immersion for one week at 140° F. (60° C.) and ambient pressure (1 atmosphere) in jet reference fluid (JRF) type 1 according to methods similar to those described in ASTM D792 or AMS 3269a, incorporated herein by reference. Jet reference fluid JRF type 1, as employed herein for determination of fuel resistance, has the following composition (see AMS 2629, issued Jul. 1, 1989), §3.1.1 et seq., available from SAE (Society of Automotive Engineers, Warrendale, Pa.) (that is incorporated herein by reference):

| | | |
|---|---|---|
| Toluene | 28 ± 1% | by volume |
| Cyclohexane (technical) | 34 ± 1% | by volume |
| Isooctane | 38 ± 1% | by volume |
| Tertiary dibutyl disulfide (doctor sweet) | 1 ± 0.005% | by volume |

The coating/sealant systems of the present invention can be deposited upon any of a variety of substrates. In certain embodiments, however, the substrate is electrically conductive, such as is the case with substrates comprising titanium, stainless steel, aluminum, as well as electrically conductive composite materials, such as polymeric materials containing a sufficient amount of conductive filler, such as carbon black. As will be appreciated, the substrate can optionally be pretreated with a corrosion-inhibiting treatment, such as anodizing or deposition of a conversion coating composition (such as is described in United States Patent Application Publication No. 2010-0243108 A1 at [0014]-[0019], the cited portion of which being incorporated herein by reference), as long as the substrate maintains its electrical conductivity. In some embodiments, the substrate is only cleaned and deoxidized prior to application of the coating/sealant systems of the present invention. Such cleaning and deoxidizing is described in the foregoing United States Patent Application Publication No. 2010-0243108 at [0014]-[0017].

In certain embodiments of the present invention, the substrate is embodied in the form of a component part of an aircraft, such as, for example, a wing, a fuselage, or a tail assemblage. More specifically, the substrate may be embodied as any of a variety of aircraft parts, such as, for example, an aileron, a wing edge (leading or trailing) or spar, slat, spoiler, flap, rudder, fin, horizontal stabilizer, elevator, tail, tube, seat track, floor track, strut, longeron, skin, rib, bulkhead, wheel, stringer, helicopter rotor blade, (including spar and outer surface), or any of a variety of flanges, hinges, clips, and fasteners, such as rivets, bolts, nuts, that connect parts together.

As previously indicated, the coating/sealant systems of the present invention comprise a coating comprising a reaction product formed from reactants comprising a phosphated epoxy resin. As used herein, the term "phosphated epoxy resin" refers to an ungelled resin derived from at least a polyepoxide and a phosphorous acid.

Suitable polyepoxides include any compound or a mixture of compounds having more than 1.0 epoxy groups per molecule. Several polyepoxides are known in the art. Examples of the polyepoxides can be found in the Handbook of Epoxy Resins, Lee and Neville, 1967, McGraw-Hill Book Company.

In certain embodiments of the present invention, the polyepoxide comprises a polyglycidyl ether of a polyphenol, such as bisphenol A. As will be appreciated, such polyepoxides can be produced by etherification of a polyphenol with an epichlorohydrin in the presence of an alkali. Suitable polyphenols include, without limitation, 1,1-bis(4-hydroxyphenyl)ethane; 2,2-bis(4-hydroxyphenyl)propane; 1,1-bis(4-hydroxyphenyl)isobutane; 2,2-bis(4-hydroxytertiarybutylphenyl)propane; bis(2-hydroxynaphthyl)methane; 1,5-dihydroxynaphthalene; 1,1-bis(4-hydroxy-3-allylphenyl)ethane; and 4,4-bis(4'-hydroxyphenyl)valeric acid. Another useful class of polyepoxides is produced similarly from polyphenol resins.

In addition to the polyepoxides described above, there can also be employed addition polymerization polymers containing pendant epoxy groups. Such polymers can be made by copolymerizing a variety of polymerizable ethylenically unsaturated monomers at least one of which is an epoxy containing monomer, e.g., glycidyl acrylate or glycidyl methacrylate.

A suitable ethylenically unsaturated monomer that does not contain a group that is reactive with the epoxy group can be employed as a comonomer. Exemplary such monomers include α,β-ethylenically unsaturated monomers, such as unsaturated carboxylic acid esters of saturated alcohols containing from 1 to about 8 carbon atoms, and monovinyl aromatic monomers such as styrene and vinyl toluene.

In certain embodiments, the polyepoxide has an epoxy equivalent weight of 172 to 5000, such as 300 to 1000.

In addition to the polyepoxide(s), the reaction mixture can contain a monomeric monoepoxide such as monoglycidyl ethers of alcohols and phenols, such as phenyl glycidyl ether, and glycidyl esters of monocarboxylic acids such as glycidyl neodecanoate.

In certain embodiments, the phosphorous acid that is reacted with the polyepoxide comprises a phosphoric acid, such as, for example, a 100 percent orthophosphoric acid or a phosphoric acid aqueous solution such as is referred to as an 85 percent phosphoric acid. Other forms of phosphoric acid such as superphosphoric acid, diphosphoric acid and triphosphoric acid can be employed herein. Also, the polymeric or partial anhydrides of phosphoric acids can be employed. In some embodiments, aqueous phosphoric acids that are of about 70 to 90 percent and preferably about 85 percent phosphoric acid are employed.

In some embodiments, the phosphorous acid that is reacted with the polyepoxide consists essentially of a phosphoric acid. In other words, in these embodiments, the phosphoric acid is present in an amount of at least 98 mole %, at least 99% mole %, or, in some cases, 100 mole %, based on the total moles of phosphorous acid that is reacted with the polyepoxide.

Alternatively, in addition to, or in lieu of, the phosphoric acid, phosphonic acids and/or phosphinic acids can be reacted with the polyepoxide. Examples of phosphonic acids are organophosphonic acids of the structure:

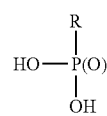

wherein R is organic radical such as those having a total of 1-30, such as 6-18 carbons. R can be aliphatic, aromatic or mixed aliphatic/aromatic and can be an unsubstituted hydrocarbon or a substituted hydrocarbon.

Examples of phosphinic acids are organophosphinic acids of the structure:

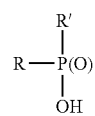

wherein R and R' are each independently hydrogen or an organic radical. Examples of such radicals are those having a total of 1-30, such as 6-18 carbons. The organic component of the phosphinic acid (R, R') can be aliphatic, aromatic or mixed aliphatic/aromatic. R and R' can be an unsubstituted hydrocarbon or a substituted hydrocarbon.

Representative suitable organophosphonic acids and organophosphinic acids are: 3-amino propyl phosphonic acid, 4-methoxyphenyl phosphonic acid, benzylphosphonic acid, butylphosphonic acid, carboxyethylphosphonic acid, diphenylphosphinic acid, dodecylphosphonic acid, ethylidenediphosphonic acid, heptadecylphosphonic acid, methylbenzylphosphonic acid, naphthylmethylphosphinic acid, octadecylphosphonic acid, octylphosphonic acid, pentylphosphonic acid, methylphenylphosphinic acid, phenylphosphonic acid, styrene phosphonic acid, dodecyl bis-1, 12-phosphonic acid, poly(ethylene glycol) phosphonic acid, including mixtures thereof.

In some embodiments of the present invention, the phosphorous acid comprises a mixture of: (a) a phosphoric acid; and (b) an organophosphonic acid and/or an organophosphinic acid. In these embodiments, as will be appreciated, the resulting phosphated epoxy resin comprises a mixture of reaction products formed from reactants comprising: (i) a polyepoxide; (ii) a phosphoric acid; and (iii) an organophosphonic acid and/or an organophosphinic acid. As will be appreciated, such a mixture of reaction products may include a phosphated epoxy resin in which the phosphated portion is derived solely from phosphoric acid, a phosphated epoxy resin in which the phosphated portion is derived solely from organophosphonic and/or organophosphinic acid, and/or a phosphated epoxy resin in which the phosphated portion is derived from both a phosphoric acid and/or organophosphonic and/or organophosphinic acid. In certain embodiments, the relative amounts of the polyepoxide and the phosphorus acids that are reacted with one another are: for each equivalent of epoxy, there are 0.1 to 0.8 moles of phosphoric acid and from 0.01 to 0.4 moles of organophosphonic and/or organophosphinic acid with the molar ratio of phosphoric to organophosphonic and/or organophosphinic acid being within the range of 1:0.01 to 0.5. The phosphated epoxy resin often has an acid value of 10 to 60, such as 15 to 50, based on resin solids.

In certain embodiments of the present invention, the reactants used to manufacture the phosphated epoxy resin further comprise a sulfur-functional azole. As used herein, "azole" means a 5-membered heterocyclic compound that contains in the heterocyclic ring two double bonds, a nitrogen atom, at least one other non-carbon atom (such as another nitrogen atom, a oxygen atom or a sulfur atom), and one or more carbon atoms. Exemplary azoles include, without limitation, diazoles, triazoles, tetrazoles, oxazoles, oxadiazoles, oxatriazoles, thiazoles, thiadiazoles, and thiatriazoles. As used herein, "sulfur-functional azole" means an azole that includes at least one sulfur atom external to the azole ring.

In certain embodiments, the sulfur-functional azole comprises a mercaptoarylimidazole, mercaptoaryloxazole, and/or a mercaptoarylthiazole.

More particularly, in certain embodiments, the mercaptoarylimidazole, mercaptoaryloxazole, or mercaptoarylthiazole is represented by the structure (I) or (II) or a tautomer thereof:

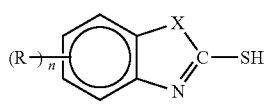

(I)

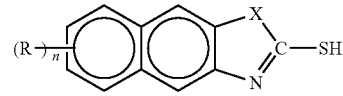

(II)

wherein: (i) X represents a nitrogen atom, an oxygen atom, or a sulfur atom; (ii) R represents hydroxyl, hydrogen, aryl, alkyl, aralkyl, or a halogen atom; and (iii) n is an integer of 0 to 4.

Specific examples of compounds according to structure (I), which are suitable for use in the present invention, include mercaptobenzimidazole, mercaptomethylbenzimidazole, mercaptohydroxybenzimidazole, mercaptoiodobenzimidazole, mercaptochlorobenzimidazole, mercaptotetrahydroxybutylphenylimidazole, mercaptobenzoxazole, mercaptomethylbenzoxazole, mercaptohydroxybenzoxazole, mercaptoiodobenzoxazole, mercaptochlorobenzoxazole, mercaptotetrahydroxybutylphenyloxazole, mercaptobenzothiazole, mercaptomethylbenzothiazole, mercaptohydroxybenzothiazole, mercaptoiodobenzothiazole, mercaptochlorobenzothiazole, mercaptotetrahydroxybutylphenylthiazole, mercaptohydroxybenzothiazole and the like, including mixtures thereof.

Specific examples of compounds according to structure (II), which are suitable for use in the present invention, include mercaptonaphthoimidazole, mercaptochloronaphthoimidazole, mercaptohydroxynaphthoimidazole, mercaptomethylnaphthoimidazole, mercaptonaphthothiazole, mercaptoiodonaphthothiazole, mercaptohydroxynaphthothiazole, mercaptomethylnaphthothiazole and the like, including mixtures thereof. Such compounds are disclosed in U.S. Pat. No. 5,498,502 at col. 4, lines 8-40, the cited portion of which being incorporated herein by reference.

Also suitable are sulfur-functional azoles that contain three or more nitrogen atoms in the heterocyclic ring, i.e., triazoles and tetrazoles. In some embodiments, the sulfur-functional azole comprises a sulfur-functional tetrazole according to the formula (III):

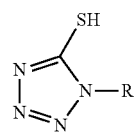

(III)

wherein R represents an organic radical, such as those having a total of 1 to 30, such as 1-18 or 6-18 or 1-6 carbon atoms. R can be aliphatic, aromatic, or mixed aliphatic/aromatic and can be unsubstituted hydrocarbon or a substituted hydrocarbon.

Specific examples of such compounds, according to formula (III) are 5-mercapto-1-methyltetrazole, 1-ethyl-5-mercaptotetrazole, 1-cyclopropyl-5-mercaptotetrazole, 1-allyl-5-mercaptotetrazole, 1-benzyl-5-mercaptotetrazole, 1-(2-methoxyethyl)-5-mercaptotetrazole, and phenyl-1H-tetrazole 5-thiol.

Examples of the sulfur-functional triazoles include 5-phenyl-1H-1,2,4-triazole-3-thiol, 3-mercapto-1,5-diphenyl-1,2,4-triazole, 3-mercapto-1,2,4-triazole, 3-mercapto-4-methyl-1,2,4-triazole, 3-mercapto-1-phenyl-1,2,4-triazole, 5-mercapto-1-phenyl-1,2,4-triazole, and 5-mercapto-1,2,4- triazole-3-acetic acid, 3,5-dimercapto-1,2,4-triazole, 3,5-dimercapto-1-phenyl-1,2,4-triazole, and 3,5-dimercapto-1,4-diphenyl-1,2,4-triazole.

Examples of sulfur-functional oxazoles include: 2-mercaptoxazolol-[4,5]pyridine; 2-mercaptoxazole, 5-nitro-2-mercaptobenzoxazole; 5-chloro-mercaptoxazole; 2-mercapto-5-phenyloxazole; 2-mercapto-4,5-dimethyloxazole; 2-mercapto-4,5-diphenyloxazole; 6-amino-mercaptobenzoxazole; 2-mercaptobenzoxazole; 2-thioxo-4-oxazolidinone.

Examples of sulfur-functional thiazoles include: 2-mercaptothiazole; 4,5-diphenyl-2-mercaptothiazole; 4-methyl-2-mercaptolthiazole; 4,5-dimethyl-2-mercaptothiazole; thiorhodanine; 2-mercapto-4-phenylthiazole; 5-thiorhodanine acetic acid; rhodaninic acid.

Examples of sulfur-functional thiadiazoles include: 5-ethyl-2-mercapto-1,3,4-thiadiazole, dimercapto-1,3,4-thiadiazole; 5-phenylmethyl-2-mercapto-1,3,4-thiadiazole; 5-aminomethyl-2-mercapto-1,3,4-thiadiazole; 2-sulfonamide-1,3,4-thiadiazole-2-thiol; 5-(propylthio)-2-mercapto-1,3,4-thiadiazole; 2-mercapto-1,3,4-thiadiazole; 5,5 thio bis (1,3,4-thiadiazole-2-thiol); 5-phenyl 2-mercapto-1,3,4-thiadiazole; 5-amino-1,3,4 thiadiazole-2-thiol.

In certain embodiments, the relative amounts of the polyepoxide and the sulfur-functional azole that are reacted with one another are for each equivalent of epoxy, there are 0.01 to 0.25 mole of thiol.

In certain embodiments, in addition to the reactants described above, the reactants used to manufacture the phosphated epoxy resin may further comprise a compound having two functional groups reactive with epoxy groups, such as, diols, diphenols (including Bisphenol A), dicarboxylic acids, dithiols, and/or diamines, to name a few.

Suitable methods for preparing the phosphated epoxy resins described herein are illustrated by the Examples. In some cases, a sulfur-functional azole is first reacted with the polyepoxide and resulting reaction product with the phosphorus acid(s). Such reactions are often conducted in organic solvent as described in the Examples.

In certain embodiments of the present invention, the phosphated epoxy resin is present in the form of an aqueous dispersion of the phosphated epoxy resin in a continuous medium primarily or principally comprising water. For example, in certain embodiments, the continuous phase is at least 80 weight percent water, based on the total weight of the continuous medium. In certain embodiments, the amount of organic solvent present in the aqueous dispersion is less than 20 weight percent, such as less than 10 weight percent, or, in some cases, less than 5 weight percent, or, in yet other cases, less than 2 weight percent, with the weight percents being based on the total weight of the continuous phase.

In adapting the phosphated epoxy resin to be dispersed in a water-based continuous medium, it is neutralized with a base. Suitable bases include both organic or inorganic bases. Illustrative examples of suitable bases are ammonia, monoalkylamines, dialkylamines, or trialkylamines such as ethylamine, propylamine, dimethylamine, dibutylamine and cyclohexylamine; monoalkanolamine, dialkanolamine or trialkanolamine such as ethanolamine, diethanolamine, triethanolamine, propanolamine, isopropanolamine, diisopropanolamine, dimethylethanolamine and diethylethanolamine; morpholine, e.g., N-methylmorpholine or N-ethylmorpholine. The percent of neutralization is such as would make the resin(s) water-dispersible and electrophoretic. Typically, the resin(s) are at least partially neutralized from 20 to 200 percent, 40 to 150 percent, such as 60 to 120 percent neutralization.

As a result, certain embodiments of the present invention are directed to aqueous resinous dispersions comprising a base-neutralized resinous composition, wherein the resinous composition comprises an ungelled phosphated epoxy resin comprising the reaction product of reactants comprising: (a) a polyepoxide; (b) a sulfur-functional azole; and (c) a phosphorous acid.

As previously indicated, in the coating/sealant systems of the present invention, the coating comprises a cured reaction product of reactants comprising the phosphated epoxy resin (such as any of those described above); and (ii) a curing agent. Therefore, certain embodiments of the aqueous resinous dispersions described above further comprise a curing agent.

Suitable curing agents include, but are not necessarily limited to, aminoplast resins and phenolplast resins. Suitable aminoplast resins are condensation products of an aldehyde, e.g., formaldehyde, acetaldehyde, crotonaldehyde, and benzaldehyde and an amino or amido group containing material such as urea, melamine, and benzoguanamine. Products obtained from the reaction of alcohols and formaldehyde with melamine, urea and benzoguanamine are often used.

Illustrative but non-limiting examples of useful aminoplast resins are those available under the trademark CYMEL from Cytec Industries and RESIMENE from Solutia Inc. Specific examples are CYMEL 1130 and 1156 and RESIMENE 750 and 753.

The relative amounts of the (a) phosphated epoxy resin and (b) curing agent is from 50 to 90, such as 60 to 75 percent by weight phosphated epoxy resin, and from 10 to 50, such as 25 to 40 percent by weight, curing agent based on solids weight of (a) and (b). In some embodiments of the present invention, the phosphated epoxy resin is present in an amount of at least 40 percent by weight, at least 50 percent by weight, such as at least 60 percent by weight, based on the total resin solids weight of the liquid composition from which the coating is formed.

In preparing the final coating composition, the above ingredients can be admixed in water in any convenient manner. Typical coating additives such as pigments, fillers, corrosion inhibitors, anti-oxidants, flow control agents, surfactants and the like can also be employed.

Suitable corrosion inhibitors are benzotriazole, 5-methyl benzotriazole, and 2-amino thiazole. Other suitable corrosion inhibitors include, but are not limited to, zinc phosphate, such as zinc orthophosphate, zinc metaborate, barium metaborate monhydrate, calcium ion-exchanged silica, colloidal silica, synthetic amorphous silica, and molybdates, such as calcium molybdate, zinc molybdate, barium molybdate, strontium molybdate, and mixtures thereof. Suitable calcium ion-exchanged silica is commercially available from W. R. Grace & Co. as SHIELDEX® AC3 and/or SHIELDEX® C303. Suitable amorphous silica is available from W. R. Grace & Co. under the tradename SYLOID®. Suitable zinc phosphate is commercially available from Heubach as HEUCOPHOS ZP-10.

Chrome-containing corrosion inhibitors are also suitable. Examples of such corrosion inhibitors are calcium chromate, magnesium chromate, strontium chromate and/or barium chromate.

In certain embodiments, the corrosion inhibitor(s), if present, are in the aqueous dispersion in amounts as low as 0.001 percent such as 0.001 to 10% by weight based on total weight of the aqueous dispersion. The composition often has a solids content of 5 to 25 percent, such as 5 to 15 percent.

In certain embodiments, the coating is deposited onto the substrate via an anionic electrodeposition process. In such a process, an electrically conductive substrate (such as any of those described earlier), serving as an anode in an electrical circuit comprising the anode and a cathode, is immersed in an aqueous resinous dispersion comprising a base-neutralized resinous composition of the type described above. An electric current is passed between the anode and the cathode to cause the resinous composition to deposit on the anode.

The electrodeposition bath often has an operating bath conductivity of 200 to 3000 micromhos per centimeter, such as 500 to 1500 micromhos per centimeter. The residence time of the substrate being coated in the bath is often from 30 to 120 seconds.

After electrocoating, the substrate is removed and then baked in an oven at a temperature and over a period sufficient to effect cure. Often, the coated substrate is baked at temperatures of 225° F. or lower, such as 200° F. or lower for 20 to 60 minutes. In some cases, the substrate is cured at 180° F. for 20 minutes to produce hard, solvent resistant and non-tacky film. If desired, the electrocoated substrates can be baked at higher temperatures of, say, 350° F.

As previously indicated, the coating/sealant systems of the present invention comprise a sealant deposited over at least a portion of the coating. In these embodiments of the present invention, the sealant is deposited from a composition comprising a sulfur-containing polymer. As used herein, the term "sulfur-containing polymer" refers to any polymer having at least one sulfur atom.

In certain embodiments, the sulfur-containing polymer comprises a polysulfide. Indeed, it has been discovered, surprisingly, that sealants formed from compositions comprising a polysulfide can adhere particularly well to certain coatings formed from an aqueous resinous dispersion comprising a base-neutralized resinous composition, wherein the resinous composition comprises an ungelled phosphated epoxy resin comprising the reaction product of reactants comprising: (a) a polyepoxide; (b) a sulfur-functional azole; and (c) a phosphorous acid, as described above.

As used herein, the term "polysulfide" refers to a polymer that contains one or more disulfide linkages, i.e., —[S—S]— linkages, in the polymer backbone and/or in the terminal or pendant positions on the polymer chain. Often, the polysulfide polymer will have two or more sulfur-sulfur linkages. Suitable polysulfides are commercially available from Akzo Nobel under the name THIOPLAST. THIOPLAST products are available in a wide range of molecular weights ranging, for example, from less than 1100 to over 8000, with molecular weight being the average molecular weight in grams per mole. In some cases, the polysulfide has a number average molecular weight of 1,000 to 4,000. The crosslink density of these products also varies, depending on the amount of crosslinking agent used. The "—SH" content, i.e., mercaptan content, of these products can also vary. The mercaptan content and molecular weight of the polysulfide can affect the cure speed of the polymer, with cure speed increasing with molecular weight.

In some embodiments of the present invention, in addition to or in lieu of, a polysulfide as previously described, the sealant is deposited from a composition comprising a polymeric mixture comprising: (a) from 90 mole percent to 25 mole percent of mercaptan terminated disulfide polymer of the formula HS(RSS)$_m$R'SH; and (b) from 10 mole percent to 75 mole percent of diethyl formal mercaptan terminated polysulfide polymer of the formula HS(RSS)$_n$RSH, wherein R is —C$_2$H$_4$—O—CH$_2$—O—C$_2$H$_4$—; R' is a divalent member selected from alkyl of from 2 to 12 carbon atoms, alkyl thioether of from 4 to 20 carbon atoms, alkyl ether of from 4 to 20 carbon atoms and one oxygen atom, alkyl ether of from 4 to 20 carbon atoms and from 2 to 4 oxygen atoms each of which is separated from the other by at least 2 carbon atoms, alicyclic of from 6 to 12 carbon atoms, and aromatic lower alkyl; and the value of m and n is such that the diethyl formal mercaptan terminated polysulfide polymer and the mercaptan terminated disulfide polymer have an average molecular weight of from 1,000 to 4,000, such as 1,000 to 2,500. Such polymeric mixtures are described in U.S. Pat. No. 4,623,711 at col. 4, line 18 to col. 8, line 35, the cited portion of which being incorporated herein by reference. In some cases, R' in the above formula is —CH$_2$—CH$_2$—; —C$_2$H$_4$—O—C$_2$H$_4$—; —C$_2$H$_4$—S—C$_2$H$_4$—; —C$_2$H$_4$—O—C$_2$H$_4$—O—C$_2$H$_4$—; or —CH$_2$—C$_6$H$_4$—CH$_2$—.

In addition to or in lieu of a polysulfide, the sulfur-containing polymer may comprise a polythioether. As used herein, the term "polythioether" refers to a polymer comprising at least one thioether linkage, i.e., —[—C—S—C—]—, in the polymer backbone and/or in the terminal or pendant positions on the polymer chain. Often, polythioethers have from 8 to 200 of these linkages. Polythioethers suitable for use in the present invention include, for example, those that includes a structure having the formula (IV):

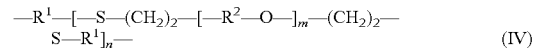

—R$^1$—[—S—(CH$_2$)$_2$—[—R$^2$—O—]$_m$—(CH$_2$)$_2$— S—R$^1$]$_n$— (IV)

wherein: (1) R$^1$ denotes a C$_{2-6}$ n-alkylene, C$_{3-6}$ branched alkylene, C$_{6-8}$ cycloalkylene or C$_{6-10}$ alkylcycloalkylene group, —[(—CH$_2$—)$_p$—X—]$_q$—(—CH$_2$—)$_r$—, or —[(CH$_2$—)$_p$—X—]$_q$—(—CH$_2$—)$_r$— in which at least one —CH$_2$— unit is substituted with a methyl group; (2) R$^2$ denotes a C$_{2-6}$ n-alkylene, C$_{2-6}$ branched alkylene, C$_{6-8}$ cycloalkylene or C$_{6-10}$ alkylcycloalkylene group, or —[(—CH$_2$—)$_p$—X—]$_q$—(—CH$_2$—)$_r$—, X denotes one selected from the group consisting of O, S and —NR$^6$—, R$^6$ denotes H or methyl; (3) m is a rational number from 0 to 10; (4) n is an integer from 1 to 60; (5) p is an integer from 2 to 6; (6) q is an integer from 1 to 5, and (7) r is an integer from 2 to 10. Such polythioethers are described in U.S. Pat. No. 6,172,179 at col. 2, line 29 to col. 4, line 34, the cited portion of which being incorporated herein by reference. Examples of suitable polythioethers are available from PRC-Desoto International, Inc., under the trademark PERMAPOL, such as PERMAPOL P-3.1e or PERMAPOL P-3.

In certain embodiments of the present invention, the sealant is deposited from a composition comprising a polymer blend comprising: (a) a polysulfide as described above; (b) a polythioether that includes a structure having the formula (III); (c) a polymeric mixture of the type described above, such as is obtained from the reaction of a polysulfide, an organic dimercaptan, such as dimercapto diethyl sulfide, and an amine. In some embodiments, the weight ratio of (a) and (b) in such polymer blends is 10:90 to 90:10, such as 50:50. Such polymer blends are described in U.S. Pat. No. 7,524,564 at col. 1, lines 51 to col. 2, line 67, the cited portion of which being incorporated herein by reference.

In certain embodiments, the sulfur-containing polymer, or blend thereof, is present in the composition from which the sealant is formed in an amount of at least 30 weight percent, such as least 40 weight percent, or, in some cases, at least 45 weight percent, based on the total weight of non-volatile components in the composition. In certain embodiments, the sulfur-containing polymer, or blend thereof, is present in the composition from which the sealant is formed in an amount of no more than 90 weight percent, such as no more than 80 weight percent, or, in some cases, no more than 75 weight percent, based on the weight of all non-volatile components of the composition.

In certain embodiments, the composition from which the sealant is formed also comprises a curing agent. Curing agents useful in certain compositions of the invention (particularly in the case in which a thiol-functional sulfur-containing polymer is used) include epoxy resins, for example, hydantoin diepoxide, diglycidyl ether of bisphenol-A, diglycidyl ether of bisphenol-F, Novolactype epoxides, and any of the epoxidized unsaturated and phenolic resins, as well as unsaturated compounds, such as acrylic and methacrylic esters of commercially available polyols, unsaturated synthetic or naturally occurring resin compounds, triallylcyanurate, and olefinic terminated derivatives of the polythioethers of the present invention.

In addition, in the case where a thiol-functional sulfur-containing polymer is used, useful cures can be obtained through oxidative coupling of the thiol groups using organic and inorganic peroxides (e.g., $MnO_2$) known to those skilled in the art.

Fillers useful in the certain embodiments of the compositions from which the sealant is deposited include those commonly used in the art, including conventional inorganic fillers, such as carbon black and calcium carbonate ($CaCO_3$), as well as lightweight fillers. Suitable lightweight fillers include, for example, those described in U.S. Pat. No. 6,525,168 at col. 4, lines 23-55, the cited portion of which being incorporated herein by reference. In certain embodiments, the compositions include 5 to 60 weight percent of the filler or combination of fillers, such as 10 to 50 weight percent, based on the total weight of the composition.

In addition to the foregoing ingredients, the sealant composition can optionally include one or more of the following: colorants, thixotropes, accelerators, retardants, adhesion promoters, solvents and masking agents, among other components.

Thixotropes, for example silica, are often used in an amount from 0.1 to 5 weight percent, based on the total weight of the composition.

Cure catalysts known to the art, such as amines, often are present in an amount from 0.1 to 5 weight percent, based on the total weight of the composition. Specific examples of useful catalysts are, without limitation, 1,4-diaza-bicyclo[2.2.2]octane (DABCO®, commercially available from Air Products, Chemical Additives Division, Allentown, Pa.) and DMP-30® (an accelerant composition including 2,4,6-tris (dimethylaminomethyl)phenol, commercially available from Rohm and Haas, Philadelphia, Pa.).

Retardants, such as stearic acid, likewise often are used in an amount from 0.1 to 5 weight percent, based on the total weight of the composition. Adhesion promoters, if employed, are often present in amount from 0.1 to 15 weight percent, based on the total weight of the composition. Suitable adhesion promoters include phenolics, such as METHYLON phenolic resin available from Occidental Chemicals, and organosilanes, such as epoxy, mercapto or amino functional silanes, such as Silquest A-187 and Silquest A-1100 available from Momentive Performance Materials. Masking agents, such as pine fragrance or other scents, which are useful in covering any low level odor of the composition, are often present in an amount from 0.1 to 1 weight percent, based on the total weight of the composition.

In certain embodiments, the sealant composition comprises a plasticizer which, in at least some cases, may allow the composition to include sulfur-containing polymer(s) which have a higher $T_g$ than would ordinarily be useful in an aerospace sealant. That is, use of a plasticizer may effectively reduce the $T_g$ of the composition, and thus increase the low-temperature flexibility of the cured polymerizable composition beyond that which would be expected on the basis of the $T_g$ of the sulfur-containing polymer alone. Plasticizers that are useful in certain embodiments of the compositions of the present invention include, for example, phthalate esters, chlorinated paraffins, and hydrogenated terphenyls. The plasticizer or combination of plasticizers often constitute 1 to 40 weight percent, such as 1 to 10 weight percent of the composition. In certain embodiments, depending on the nature and amount of the plasticizer(s) used in the composition, thioethers of the invention which have $T_g$ values up to −50° C., such as up to −55° C., can be used.

In certain embodiments, the sealant composition can further comprise one or more organic solvents, such as isopropyl alcohol, in an amount ranging from, for example, 0 to 15 percent by weight on a basis of total weight of the composition, such as less than 15 weight percent and, in some cases, less than 10 weight percent.

The coating/sealants systems of the present invention can, in at least some cases, exhibit excellent interlayer adhesion as well as adhesion to the substrate. In some embodiments of the present invention, the coating/sealant systems of the present invention exhibit an average peel strength of at least 150N/25 mm, such as at least 200N/25 mm, and a % cohesive of at least 50%, such as at least 90%, or, in some cases, 100%, when measured according to AS 5127/1B as described in the Examples herein.

These and other aspects of the claimed invention are further illustrated by the following non-limiting examples.

EXAMPLES

Example 1

Preparation of Aqueous Resinous Dispersion

A 12-liter round bottom 4-neck flask was equipped with a stirrer with bearing, a water-cooled condenser, a thermocouple probe with nitrogen inlet adapter and an electrically-heated mantle. The flask was charged with 2949.8 grams (7.845 mole) of bisphenol A diglycidyl ether (equivalent weight 188), 948.8 grams (4.162 mole) of bisphenol A, 418.9 grams of 2-n-butoxyethanol, and 335.3 grams 2-ethylhexanol. Under a nitrogen blanket, this was stirred and heated to 115° C. At 115° C., 2.9 grams of ethyl triphenylphosphonium iodide (available from Sigma-Aldrich) was added. This was heated until an exotherm began, and the reaction mixture was maintained at or above 165° C. for 60 minutes. To the reaction mixture was added 383.3 grams of Ektasolve EEH (available from Eastman Chemical Company) and 83.6 grams of 2-ethylhexanol as it was cooled to 90° C. At 90° C., a mixture of 67.9 grams (0.430 mole) of phenylphosphonic acid, 115.6 grams (1.003 mole) of 85% o-phosphoric acid, and 24.7 grams of Ektasolve EEH was added. After the exotherm, the reaction mixture was held at 120° C. for 30 minutes, and then it was cooled to 100° C. At 100° C., 257.6 grams of deionized water was added over about an hour, and the reaction mixture was held at 100° C. afterwards for 2 hours. At that point, it was cooled to 90° C. and 324.2 grams (2.437 mole) of diisopropanolamine and 1487.2 grams of Cymel 1130 (available from Cytec Industries, Inc.) were added. The mixture was held at 90° C. for 30 minutes. Of this material, 7000 grams was stirred into 5511.4 grams of deionized water, followed by the addition of 1317.0 grams more deionized water. To this was added 366.4 grams of 2-hexoxyethanol, 225.5 grams of Optifilm 400 (available from Eastman Chemical Company), and 5.5 grams of Tektronic 150R1 (available from the BASF Corporation). Subsequently 1045.5 grams of deionized water was added to yield a dispersion evidencing 39.4% solids after 1 hour at 110° C.

Example 2

Preparation of Aqueous Resinous Dispersion

A 3-liter round bottom 4-neck flask was equipped with a stirrer with bearing, a water-cooled condenser, a thermocouple probe with nitrogen inlet adapter and an electrically-heated mantle. The flask was charged with 705 grams (3.75 mole) of bisphenol A diglycidyl ether (equivalent weight 188), 222.6 grams (1.952 mole) of bisphenol A, 39 grams (0.237 mole) of mercaptomethylbenzoimidazole (available from Sigma-Aldrich), and 180.3 grams of 2-n-butoxyethanol. Under a nitrogen blanket, this was stirred and heated to 115° C. At 115° C., 0.7 grams of ethyl triphenylphosphonium iodide (available from Sigma-Aldrich) was added. This was heated until an exotherm began, and the reaction mixture was maintained at or above 165° C. for 60 minutes. To the reaction mixture was added 112 grams of 2-n-butoxyethanol as it was cooled to 90° C. At 90° C., 27.6 grams of 85% o-phosphoric acid was added. After the exotherm, the reaction mixture was held at 120° C. for 30 minutes, and then it was cooled to 100° C. At 100° C., 61.6 grams of deionized water was added over about an hour, and the reaction mixture was held at 100° C. afterwards for 2 hours. At that point, it was cooled to 90° C. and 63.8 grams of diisopropanolamine, 330.5 grams of Cymel 1130 (available from Cytec Industries, Inc.) and 40.1 grams of mercaptomethylbenzoimidazole were added. The mixture was held at 90° C. for 30 minutes. Of this material, 1650 grams was stirred into 1350 grams of deionized water, followed by the addition of 315.8 grams deionized water, then finally 390.1 grams of deionized water. The final dispersion evidenced 30.3% solids after 1 hour at 110° C.

Example 3

Preparation of Aqueous Resinous Dispersion

A 3-liter round bottom 4-neck flask was equipped with a stirrer with bearing, a water-cooled condenser, a thermocouple probe with nitrogen inlet adapter and an electrically-heated mantle. The flask was charged with 450 grams (2.39 mole) of bisphenol A diglycidyl ether (equivalent weight 188), 142.1 grams (1.25 mole) of bisphenol A, 15.9 grams (0.135 mole) of phenyl-1H-tetrazole 5-thiol (available from Sigma-Aldrich) and 115.1 grams of 2-n-butoxyethanol. Under a nitrogen blanket, this was stirred and heated to 115° C. At 115° C., 0.5 grams of ethyl triphenylphosphonium iodide (available from Sigma-Aldrich) was added. This was heated until an exotherm began, and the reaction mixture was maintained at or above 165° C. for 60 minutes. To the reaction mixture was added 71.2 grams of 2-n-butoxyethanol as it was cooled to 90° C. At 90° C., 17.6 grams of 85% o-phosphoric acid was added. After the exotherm, the reaction mixture was held at 120° C. for 30 minutes, and then it was cooled to 100° C. At 100° C., 39.3 grams of deionized water was added over about an hour, and the reaction mixture was held at 100° C. afterwards for 2 hours. At that point, it was cooled to 90° C. and 40.7 grams of diisopropanolamine, 211.0 grams of Cymel 1130 (available from Cytec Industries, Inc.) and 26.1 grams phenyl-1H-tetrazole-5-thiol was added. The mixture was held at 90° C. for 30 minutes. Of this material, 1000 grams was stirred into 814 grams of deionized water and the dispersion agitated for 1 hour, followed by the addition of 190.9 grams deionized water, then finally 235.9 grams of deionized water. The final dispersion evidenced 36.1% solids after 1 hour at 110° C.

Example 4

Preparation of Aqueous Resinous Dispersion

A 3-liter round bottom 4-neck flask was equipped with a stirrer with bearing, a water-cooled condenser, a thermocouple probe with nitrogen inlet adapter and an electrically-heated mantle. The flask was charged with 727.9 parts (3.87 mole) of bisphenol A diglycidyl ether (equivalent weight 188), 229.8 grams (2.02 mole) of bisphenol A and 186.1 grams of 2-n-butoxyethanol. Under a nitrogen blanket, this was stirred and heated to 115° C. At 115° C., 0.7 grams of ethyl triphenylphosphonium iodide (available from Sigma-Aldrich) was added. This was heated until an exotherm began, and the reaction mixture was maintained at or above 165° C. for 60 minutes. To the reaction mixture was added 115.2 grams of 2-n-butoxyethanol as it was cooled to 90° C. At 90° C., 42.2 grams of 2-mercaptobenzothiazole was added and the reaction maintained for 30 minutes. To the reaction mixture 28.5 grams of 85% o-phosphoric acid was added. After the exotherm, the reaction mixture was held at 120° C. for 60 minutes, and then it was cooled to 100° C. At 100° C., 63.6 grams of deionized water was added over about an hour, and the reaction mixture was held at 100° C. afterwards for 2 hours. At that point, it was cooled to 90° C. and 65.8 grams of diisopropanolamine, and 341.3 grams of Cymel 1130 (available from Cytec Industries, Inc.) were added. The mixture was held at 90° C. for 30 minutes. Of this material, 1600 grams was stirred into 1267.4 grams of deionized water and the dispersion agitated for 1 hour, followed by the addition of 301.8 grams deionized water, then finally 372.8 grams of deionized water. The final dispersion evidenced 34.0% solids after 1 hour at 110° C.

Examples 5-8

Preparation of Coating Compositions

Coating compositions were prepared using the ingredients and amounts (parts by weight) listed in Table 1. The pH and conductivity of the final composition is also set forth in Table 1.

TABLE 1

| Ingredients | Example 5 | Example 6 | Example 7 | Example 8 |
|---|---|---|---|---|
| Dispersion of Example 1 | 1632.7 | — | — | — |
| Dispersion of Example 2 | — | 1294.1 | — | — |
| Dispersion of Example 3 | — | — | 1565.8 | — |
| Dispersion of Example 4 | — | — | — | 1120.1 |
| Pigment Paste[1] | 331.1 | 217.8 | 306.8 | 217.8 |
| Deionized water | 1836.2 | 988.1 | 1727.5 | 1162.1 |
| pH[2] | 8.61 | 8.81 | 8.45 | 8.65 |
| Conductivity ($\Omega^{-1}$)[3] | 867 | 710 | 927 | 964 |

[1]Grey pigment paste, ACPP-1120, available from PPG Industries, Inc., 51.4% solids.
[2]Measured with an ACCUMET pH meter commercially available from Fisher Scientific
[3]Measured with a conductivity meter commercially available from YSI, Inc In each case, the dispersion was added to a gallon container. Under agitation the pigment paste was added to the dispersion along with the deionized water. Final bath solids were about 20% with a pigment to resin ratio of 0.2:1.0. Fifty percent of the total bath was removed by ultrafiltration and replaced with deionized water.

Test Substrates

Aluminum 2024-T3 bare panels were cleaned by immersing in a solution of RIDOLINE 298, an alkaline cleaner available from Henkel Corporation, for two minutes at 130° F. After alkaline cleaning, the panels were immersed in tap water rinse for one minute at ambient conditions. The panels were then immersed in a solution of DEOXIDIZER 6/16, an acidic deoxidizer available from Henkel Corporation, for two minutes and thirty seconds at ambient conditions. After the acid deoxidation, the panels were immersed in tap water for one minute at ambient conditions followed by a final spray rinse of deionized water. The panels were air dried prior to use.

The coating compositions of Examples 5, 6, 7, and 8 were deposited onto clean and deoxidized panels that were 2¾" by 6". This was done by heating the coating compositions of Examples 5 and 6 to 75° F. (24° C.) and Examples 7 and 8 to 90° F. (32° C.). The panels were immersed in a bath of the coating composition under agitation and then impressed with 85 to 275 volts for 90 seconds and thermally cured for 30 minutes at 200° F. (93° C.) to achieve a film thickness of about 0.8 mils.

Sealant adhesion was evaluated using PR-1776 M B-2 sealant, commercially available from PRC-DeSoto International, Inc. Panels were prepared per AS5127/1B with the following modifications: aluminum foil strips were used in place of the wire screen or fabric reinforcement. The foil strips were 0.005" thick measuring 1" wide by 12" long. Foil preparation included scuff abrading with grey SCOTCH BRITE Pads™, solvent cleaning with solvent per AS5127/1B, and application of PR-148 adhesion promoter commercially available from PRC-DeSoto International, Inc., per manufacturer's instructions. Panels were cured for 14 days at 75° F. and 50% relative humidity and then tested for peel strength per AS5127/1B.

Results are set forth in Table 2.

TABLE 2

| Example | Peel Strength[1] Reading 1 N/25 mm | Peel Strength[1] Reading 2 N/25 mm | Peel Strength[1] Reading 3 N/25 mm | Peel Strength[1] Reading 4 N/25 mm | Average Peel Strength N/25 mm | % Cohesive[2] |
|---|---|---|---|---|---|---|
| 5 | 52 | 57 | 42 | 38 | 47 | 0 |
| 6 | 182 | 215 | 222 | 228 | 212 | 100 |
| 7 | 115 | 164 | 163 | 184 | 157 | 30 |
| 8 | 198 | 212 | 204 | 204 | 205 | 99 |

[1]Peel strength is a measurement of the force required to pull the foil strip away from the substrate
[2]% Cohesive refers to the portion of the surface area of the substrate to which the sealant remains adhered after the foil strip is pulled away from the substrate (result is reported as average of four readings).

Example 9

Preparation of Aqueous Resinous Dispersion

A 12-liter round bottom 4-neck flask was equipped with a stirrer with bearing, a water-cooled condenser, a thermocouple probe with nitrogen inlet adapter and an electrically-heated mantle. The flask was charged with 2337.4 grams (6.216 mole) of bisphenol A diglycidyl ether (equivalent weight 188), 751.9 grams (3.298 mole) of bisphenol A, 332.0 grams of 2-n-butoxyethanol, and 265.7 grams 2-ethylhexanol. Under a nitrogen blanket, this was stirred and heated to 115° C. At 115° C., 2.3 grams of ethyl triphenylphosphonium iodide (available from Sigma-Aldrich) was added. This was heated until an exotherm began, and the reaction mixture was maintained at or above 165° C. for 60 minutes. To the reaction mixture was added 303.8 grams of Ektasolve EEH (available from Eastman Chemical Company) and 66.2 grams of 2-ethylhexanol as it was cooled to 90° C. At 90° C., a mixture of 53.8 grams (0.340 mole) of phenylphosphonic acid, 91.6 grams (0.794 mole) of 85% o-phosphoric acid, and 19.6 grams of Ektasolve EEH was added. After the exotherm, the reaction mixture was held at 120° C. for 30 minutes, and then it was cooled to 100° C. At 100° C., 204.1 grams of deionized water was added over about an hour, and the reaction mixture was held at 100° C. afterwards for 2 hours. At that point, it was cooled to 90° C. and 256.9 grams (1.932 mole) of diisopropanolamine, 1178.5 grams of Cymel 1130 (available from Cytec Industries, Inc.), and 136.1 grams (1.144 mole) of 2-mercaptobenzothiazole were added. The mixture was held at 90° C. for 30 minutes. Of this material, 5600 grams was stirred into 4484.5 grams of deionized water, followed by the addition of 1061.5 grams more deionized water. To this was added 295.4 grams of 2-hexoxyethanol, 181.8 grams of Optifilm 400 (available from Eastman Chemical Company), and 4.4 grams of Tektronic 150R1 (available from the BASF Corporation). Subsequently, 842.7 grams of deionized water was added to yield a dispersion evidencing 38.6% solids after 1 hour at 110° C.

Example 10

Preparation of Aqueous Resinous Dispersion

A 12-liter round bottom 4-neck flask was equipped with a stirrer with bearing, a water-cooled condenser, a thermocouple probe with nitrogen inlet adapter and an electrically-heated mantle. The flask was charged with 2102.9 grams (5.593 mole) of bisphenol A diglycidyl ether (equivalent weight 188), 663.9 grams (2.912 mole) of bisphenol A, 118.3 grams (0.707 mole) of 2-mercaptobenzothiazole, and 537.7 grams of 2-n-butoxyethanol. Under a nitrogen blanket, this was stirred and heated to 115° C. At 115° C., 2.1 grams of ethyl triphenylphosphonium iodide (available from Sigma-Aldrich) was added. This was heated until an exotherm began, and the reaction mixture was maintained at or above 165° C. for 60 minutes. To the reaction mixture was added 332.9 grams of 2-n-butoxyethanol as it was cooled to 90° C. At 90° C., 82.4 grams (0.715 mole) of 85% o-phosphoric acid was added. After the exotherm, the reaction mixture was held at 120° C. for 30 minutes, and then it was cooled to 100° C. At 100° C., 183.7 grams of deionized water was added over about an hour, and the reaction mixture was held at 100° C. afterwards for 2 hours. At that point, it was cooled to 90° C. and 190.2 grams (1.430 mole) of diisopropanolamine and 985.9 grams of Cymel 1130 (available from Cytec Industries, Inc.) were added. The mixture was held at 90° C. for 30 minutes. Of this material, 4800 grams was stirred into 3926.5 grams of deionized water, followed by the addition of 918.6 grams deionized water, then finally 1134.7 grams of deionized water. The final dispersion evidenced 37.1% solids after 1 hour at 110° C.

Example 11

Preparation of Aqueous Resinous Dispersion

A 3000 ml round bottom 4-neck flask was equipped with a stirrer with bearing, a water-cooled condenser, a thermocouple probe with nitrogen inlet adapter and an electrically-heated mantle. The flask was charged with 400.8 grams (1.0660 mole) of bisphenol A diglycidyl ether (equivalent weight 188), 128.9 grams (0.565 mole) of bisphenol A, and 102.5 grams of 2-n-butoxyethanol. Under a nitrogen blanket, this was stirred and heated to 115° C. At 115° C., 0.4 grams of ethyl triphenylphosphonium iodide (available from Sigma-Aldrich) was added. This was heated until an exotherm began, and the reaction mixture was maintained at or above 165° C. for 60 minutes. To the reaction mixture was added 66.8 grams of 2-n-butoxyethanol as it was cooled to 90° C. At 90° C., 19.1 grams (0.166 mole) of 85% o-phosphoric acid was added. After the exotherm, the reaction mixture was held at 120° C. for 30 minutes, and then it was cooled to 100° C. At 100° C., 35.0 grams of deionized water was added over about 45 minutes, and the reaction mixture was held at 100° C. afterwards for 2 hours. At that point, it was cooled to 90° C. and 53.5 grams (0.402 mole) of diisopropanolamine, 202.1 grams of Cymel 1130 (available from Cytec Industries, Inc.), and 90.9 grams of the adduct of Example 12 were added. The mixture was held at 90° C. for 30 minutes. Of this material, 900 grams was stirred into 708.6 grams of deionized water, followed by the addition of 169.3 grams deionized water, then finally 209.2 grams of deionized water. The final dispersion evidenced 38.7% solids after 1 hour at 110° C.

Example 12

Preparation of Adduct

A 1-liter round bottom 4-neck flask was equipped with a stirrer with bearing, a water-cooled condenser, a thermocouple probe with nitrogen inlet adapter and an electrically-heated mantle. The flask was charged, in order, with 40.2 grams mercaptobenzothiazole, 92.5 grams EPON 828 and 192.0 grams methyl amyl ketone. The reaction was heated to 50° C. and held for 1 hour. Temperature was increased until refluxing occurred (116° C.). The reaction was held for 6 hours and the condenser replaced with a distillation head and condenser. The heating mantle was set for 118° C. and volatile components were removed (173 g) until the set temp was reached. The final material was 86% solids and the desired product was confirmed by nuclear magnetic resonance.

Examples 13-15

Preparation of Coating Compositions

Coating compositions was prepared using the ingredients and amounts (parts by weight) listed in Table 3. The pH and conductivity of the final composition is also set forth in Table 3.

TABLE 3

| Ingredients | Example 13 | Example 14 | Example 15 |
|---|---|---|---|
| Dispersion of Example 9 | 1546.8 | — | — |
| Dispersion of Example 10 | — | 2212.4 | — |
| Dispersion of Example 11 | — | — | 1543.6 |
| Pigment Paste[1] | 331.1 | 455.0 | 331.1 |
| Deionized water | 1922.2 | 2555.1 | 1925.4 |
| pH[2] | 8.34 | 8.69 | 8.25 |
| Conductivity $(\Omega^{-1})$[3] | 974 | 807 | 985 |

In each case, the dispersion was added to a gallon container. Under agitation the pigment paste was added to the dispersion along with the deionized water. Final bath solids were about 20% with a pigment to resin ratio of 0.2:1.0. Fifty percent of the total bath was removed by ultrafiltration and replaced with deionized water.

Test Substrates

Aluminum 2024-T3 bare panels were cleaned by immersing in a solution of RIDOLINE 298, an alkaline cleaner available from Henkel Corporation, for two minutes at 130° F. After alkaline cleaning, the panels were immersed in tap water rinse for one minute at ambient conditions. The panels were then immersed in a solution of DEOXIDIZER 6/16, an acidic deoxidizer available from Henkel Corporation, for two minutes and thirty seconds as ambient conditions. After the acid deoxidation, the panels were immersed in tap water for one minute at ambient conditions followed by a final spray rinse of deionized water. The panels were air dried prior to use.

The coating compositions of Examples 5, 13, 14, and 15 were deposited onto clean and deoxidized panels that were 2¾" by 6". This was done by heating the coating compositions of Example 5 and 13 to 75° F. (24° C.) and Examples 14 and 15 to 90° F. (32° C.). The panels were immersed in a bath of the coating composition under agitation and then impressed with 85 to 275 volts for 90 seconds and thermally cured for 30 minutes at 200° F. (93° C.), with the exception of Example 15 which was cured for 60 minutes, to achieve a film thickness of about 0.8 mils.

Sealant adhesion was evaluated using PR-1776 M B-2 sealant, commercially available from PRC-DeSoto International, Inc. Panels were prepared per AS5127/1B with the following modifications: aluminum foil strips were used in place of the wire screen or fabric reinforcement. The foil strips were 0.005" thick measuring 1" wide by 12" long. Foil preparation included scuff abrading with grey SCOTCH BRITE Pads™, solvent cleaning with solvent per AS5127/1B, and application of PR-148 adhesion promoter commercially available from PRC-DeSoto International, Inc., per manufacturer's instructions. Panels were cured for 14 days at ambient temperature and humidity conditions and then tested for peel strength per AS5127/1B.

Results are set forth in Table 4.

TABLE 4

| Example | Panel # | Peel Strength[1] Reading 1 N/25 mm | Peel Strength[1] Reading 1 N/25 mm | Peel Strength[1] Reading 1 N/25 mm | Peel Strength[1] Reading 1 N/25 mm | Average Peel Strength N/25 mm | % Cohesive[2] |
|---|---|---|---|---|---|---|---|
| 5 | A | 92 | 78 | 55 | 74 | 75 | 0 |
|   | B | 51 | 97 | 80 | 71 | 75 | 0 |

TABLE 4-continued

| Example | Panel # | Peel Strength[1] Reading 1 N/25 mm | Peel Strength[1] Reading 1 N/25 mm | Peel Strength[1] Reading 1 N/25 mm | Peel Strength[1] Reading 1 N/25 mm | Average Peel Strength N/25 mm | % Cohesive[2] |
|---|---|---|---|---|---|---|---|
| 13 | A | 71 | 64 | 47 | 42 | 56 | 3 |
|    | B | 64 | 75 | 46 | 48 | 58 | 2 |
| 14 | A | 234 | 227 | 238 | 204 | 226 | 100 |
|    | B | 156 | 165 | 167 | 161 | 162 | 100 |
| 15 | A | 46 | 51 | 59 | 53 | 52 | 0 |
|    | B | 46 | 67 | 58 | 74 | 61 | 5 |

[1] Peel strength is a measurement of the force required to pull the foil strip away from the substrate
[2] % Cohesive refers to the portion of the surface area of the substrate to which the sealant remains adhered after the foil strip is pulled away from the substrate (result is reported as average of four readings).

Whereas particular embodiments of this invention have been described above for purposes of illustration, it will be evident to those skilled in the art that numerous variations of the details of the present invention may be made without departing from the invention as defined in the appended claims.

What is claimed is:

1. A coating/sealant system comprising:
   (a) a coating comprising a reaction product formed from reactants comprising:
      (i) a phosphated epoxy resin comprising a reaction product of reactants comprising:
         a polyepoxy; and
         a sulfur-functional azole selected from the group consisting of a mercaptoarylimidazole, a mercaptoaryloxazole, a mercaptoarylthiazole, and a combination of any of the foregoing; and
         a phosphorous acid or a mixture of a phosphoric acid, and an organophosphonic acid and/or an organophosphinic acid; and
      (ii) a curing agent comprising an aminoplast; and
   (b) a sealant deposited over at least a portion of the coating, wherein the sealant is deposited from a composition comprising a sulfur-containing polymer comprising a thiol-functional polysulfide.

2. The system of claim 1, wherein the phosphorous acid comprises an acid selected from the group consisting of a phosphoric acid, an organophosphonic acid, and an organophosphinic acid.

3. The system of claim 2, wherein the reactants comprise from 0.1 to 0.8 mole of phosphoric acid to one equivalent of epoxy and from 0.01 to 0.4 mole of organophosphonic acid and/or an organophosphinic acid per equivalent of epoxy.

4. The system of claim 1, wherein the phosphated epoxy resin is present in an amount of at least 50 percent by weight, based on the total resin solids weight of a liquid composition from which the coating is deposited.

5. The system of claim 1, wherein the sulfur-functional azole is represented by the structure (I) or (II):

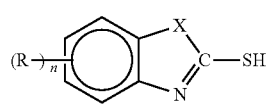

(I)

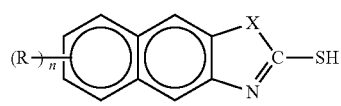

(II)

wherein: (i) X represents N, O or S; (ii) R represents hydroxyl, hydrogen, aryl, alkyl, aralkyl, or a halogen atom; and (iii) n is an integer of 0 to 4.

6. The system of claim 1, wherein the sulfur-functional azole is present in an amount of 0.01 to 0.25 mole of thiol to one equivalent of epoxy.

7. The system of claim 1, wherein the thiol-functional polysulfide comprises a polymeric mixture comprising:
   (a) from 90 mole percent to 25 mole percent of mercaptan terminated disulfide polymer of the formula $HS(RSS)_m R'SH$; and
   (b) from 10 mole percent to 75 mole percent of diethyl formal mercaptan terminated polysulfide polymer of the formula $HS(RSS)_n RSH$, wherein R is $-C_2H_4-O-CH_2-O-C_2H_4-$;

R' is a divalent member selected from the group consisting of alkyl of from 2 to 12 carbon atoms, alkyl thioether of from 4 to 20 carbon atoms, alkyl ether of from 4 to 20 carbon atoms and one oxygen atom, alkyl ether of from 4 to 20 carbon atoms and from 2 to 4 oxygen atoms each of which is separated from the other by at least 2 carbon atoms, alicyclic of from 6 to 12 carbon atoms, and aromatic lower alkyl; and
   the value of m and n is such that the diethyl formal mercaptan terminated polysulfide polymer and the mercaptan terminated disulfide polymer have an average molecular weight of from 1,000 to 4,000.

8. The system of claim 1, wherein the reactants comprise a compound having two functional groups reactive with epoxy groups.

9. The system of claim 1, wherein,
   the phosphated epoxy resin comprises the reaction products of an azole-functional polyepoxy and the phosphorous acid or the mixture of a phosphoric acid, and an organophosphonic acid and/or an organophosphinic acid, wherein,
   the azole-functional polyepoxy comprises the reaction product of reactants comprising the polyepoxy and the sulfur-functional azole; and
   for each equivalent of epoxy in the polyepoxy there are from 0.01 moles to 0.25 moles of thiol in the sulfur-functional azole.

10. The system of claim 1, wherein,
    the phosphated epoxy resin comprises the reaction product of reactants comprising a phosphated polyepoxy and the sulfur-functional azole, wherein,
    the phosphated polyepoxy comprises the reaction product of reactants comprising the polyepoxy and the phosphorous acid or the mixture of a phosphoric acid, and an organophosphonic acid and/or an organophosphinic acid; and for each equivalent of epoxy in the polyepoxy there are from 0.01 moles to 0.25 moles of thiol in the sulfur-functional azole.

11. An aqueous resinous dispersion comprising a base-neutralized resinous composition comprising an ungelled phosphated epoxy resin, wherein the ungelled phosphated epoxy resin comprises a reaction product formed from reactants comprising:
   a polyepoxy;
   a sulfur-functional azole selected from the group consisting of a mercaptoarylimidazole, a mercaptoaryloxazole, a mercaptoarylthiazole, and a combination of any of the foregoing; and
   a phosphorous acid or a mixture of a phosphoric acid, and an organophosphonic acid and/or an organophosphinic acid.

12. The dispersion of claim 11, wherein the phosphorous acid comprises an acid selected from the group consisting of a phosphoric acid, an organophosphonic acid, and an organophosphinic acid.

13. The dispersion of claim 11, wherein the reactants comprise from 0.1 to 0.8 mole of phosphoric acid to one equivalent of epoxy and from 0.01 to 0.4 mole of organophosphonic acid and/or an organophosphinic acid per equivalent of epoxy.

14. The dispersion of claim 11, further comprising a curing agent comprising an aminoplast.

15. The dispersion of claim 11, wherein the phosphated epoxy resin is present in an amount of at least 50 percent by weight, based on the total resin solids weight of the dispersion.

16. The dispersion of claim 11, wherein the sulfur-functional azole is represented by the structure (I) or (II):

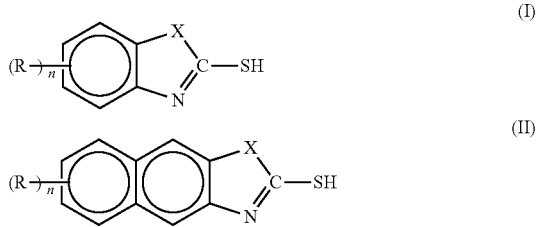

wherein: (i) X represents N, O or S; (ii) R represents hydroxyl, hydrogen, aryl, alkyl, aralkyl, or a halogen atom; and (iii) n is an integer of 0 to 4.

17. The dispersion of claim 11, wherein the sulfur-functional azole is present in an amount of 0.01 to 0.25 mole of thiol to one equivalent of epoxy.

18. The dispersion of claim 11, wherein the reactants comprise a compound having two functional groups reactive with epoxy groups.

19. The dispersion of claim 11, wherein the ungelled phosphated epoxy resin comprises a reaction product of reactants comprising an azole-functional polyepoxy and the phosphorous acid or the mixture of a phosphoric acid, and an organophosphonic acid and/or an organophosphinic acid, wherein,
   the azole-functional polyepoxy comprises the reaction product of reactants comprising the polyepoxy and the sulfur-functional azole; and
   for each equivalent of epoxy in the polyepoxy there are from 0.01 moles to 0.25 moles of thiol in the sulfur-functional azole.

20. The dispersion of claim 11, wherein the ungelled phosphated epoxy resin comprises a reaction product of reactants comprising a phosphated polyepoxy and the sulfur-functional azole, wherein,
   the phosphated polyepoxy comprises the reaction product of reactants comprising the polyepoxy and the phosphorous acid or the mixture of a phosphoric acid, and an organophosphonic acid and/or an organophosphinic acid; and
   for each equivalent of epoxy in the polyepoxy there are from 0.01 moles to 0.25 moles of thiol in the sulfur-functional azole.

21. A method of electrocoating an electrically conductive substrate serving as an anode in an electrical circuit comprising the anode and a cathode that are immersed in an aqueous resinous dispersion comprising passing electric current between the anode and the cathode to cause a resinous composition to deposit on the anode, the dispersion comprising an anionic resin comprising a reaction product formed from reactants comprising:
   a polyepoxy;
   a sulfur-functional azole selected from the group consisting of a mercaptoarylimidazole, a mercaptoaryloxazole, a mercaptoarylthiazole, and a combination of any of the foregoing; and
   a phosphorous acid or a mixture of a phosphoric acid, and an organophosphonic acid and/or an organophosphinic acid.

22. The method of claim 21, wherein the substrate comprises aluminum.

23. The method of claim 21, wherein the reaction product further comprises a compound having two functional groups reactive with epoxy groups.

24. The method of claim 21, wherein the phosphorous acid comprises an acid selected from the group consisting of a phosphoric acid, and an organophosphonic acid, an organophosphinic acid.

25. The method of claim 21, wherein the anionic resin comprises the reaction product of reactants comprising an azole-functional polyepoxy and the phosphorous acid or the mixture of a phosphoric acid, and an organophosphonic acid and/or an organophosphinic acid, wherein,
   the azole-functional polyepoxy comprises the reaction product of reactants comprising the polyepoxy and the sulfur-functional azole; and
   for each equivalent of epoxy in the polyepoxy there are from 0.01 moles to 0.25 moles of thiol in the sulfur-functional azole.

26. The method of claim 21, wherein the anionic resin comprises the reaction product of reactants comprising a phosphated polyepoxy and the sulfur-functional azole, wherein,
   the phosphated polyepoxy comprises the reaction product of reactants comprising the polyepoxy and the phosphorous acid or the mixture of a phosphoric acid, and an organophosphonic acid and/or an organophosphinic acid; and
   for each equivalent of epoxy in the polyepoxy there are from 0.01 moles to 0.25 moles of thiol in the sulfur-functional azole.

27. A method for making a base-neutralized aqueous resinous dispersion comprising:
   (a) reacting a sulfur-functional azole with a polyepoxide to form a first reaction product, wherein the sulfur-functional azole is selected from the group consisting of a mercaptoarylimidazole, a mercaptoaryloxazole, a mercaptoarylthiazole, and a combination of any of the foregoing;

(b) reacting the first reaction product with a phosphorous acid or a mixture of a phosphoric acid, and an oranophosphonic acid and/or an oranophosphinic acid to form a second reaction product; and (c) adding a base and water to the second reaction product.

28. The method of claim 27, wherein for each equivalent of epoxy there are from 0.01 moles to 0.25 moles of thiol.

29. A method for making a base-neutralized aqueous resinous dispersion comprising:

(a) reacting a polyepoxide with a phosphorous acid or a mixture of a phosphoric acid, and an organophosphonic acid and/or an organophosphinic acid to form a first reaction product; and (b) reacting the first reaction product with a sulfur-functional azole to form a second reaction product, wherein the sulfur-functional azole is selected from the group consisting of a mercaptoarylimidazole, a mercaptoaryloxazole, a mercaptoarylthiazole, and a combination of any of the foregoing; and (c) adding a base and water to the second reaction product.

30. The method of claim 29, wherein for each equivalent of epoxy there are from 0.01 moles to 0.25 moles of thiol.

* * * * *